United States Patent [19]
Bunczek et al.

[11] Patent Number: 6,017,566
[45] Date of Patent: Jan. 25, 2000

[54] GUM BASE AND CHEWING GUM CONTAINING EDIBLE POLYESTERS AND METHOD FOR MANUFACTURE

[75] Inventors: Michael T. Bunczek, Lisle; Michael J. Greenberg, Northbrook; Philip W. Urnezis, Lombard, all of Ill.

[73] Assignee: Wm. Wrigley Jr. Company, Chicago, Ill.

[21] Appl. No.: 09/147,912

[22] PCT Filed: Oct. 20, 1997

[86] PCT No.: PCT/US97/18885

§ 371 Date: Mar. 23, 1999

§ 102(e) Date: Mar. 23, 1999

[87] PCT Pub. No.: WO98/17124

PCT Pub. Date: Apr. 30, 1998

Related U.S. Application Data

[63] Continuation-in-part of application No. PCT/US96/16986, Oct. 22, 1996.
[51] Int. Cl.[7] .................................................. A23G 3/30
[52] U.S. Cl. ................................................ 426/3; 426/4
[58] Field of Search ............................................. 426/3, 4

[56] References Cited

U.S. PATENT DOCUMENTS

| | | |
|---|---|---|
| 3,542,917 | 11/1970 | Schwartz et al. . |
| 4,525,363 | 6/1985 | D'Amelia et al. ............................ 426/3 |
| 5,057,328 | 10/1991 | Cherukuri et al. ........................... 426/5 |
| 5,116,627 | 5/1992 | Rutherford et al. ......................... 426/5 |
| 5,165,944 | 11/1992 | Song et al. .................................. 426/5 |
| 5,354,573 | 10/1994 | Gross et al. .............................. 426/603 |
| 5,360,626 | 11/1994 | Iyengar et al. ........................... 426/601 |
| 5,458,890 | 10/1995 | Williford et al. ............................ 426/3 |
| 5,512,339 | 4/1996 | Dujardin et al. ....................... 428/35.7 |
| 5,672,367 | 9/1997 | Grijpma et al. ............................. 426/3 |

FOREIGN PATENT DOCUMENTS

| | | |
|---|---|---|
| 0 067 595 | 3/1987 | European Pat. Off. . |
| 0 711 506 | 5/1996 | European Pat. Off. . |
| 94-01703 | 10/1994 | Netherlands . |

*Primary Examiner*—Arthur L. Corbin
*Attorney, Agent, or Firm*—Hill & Simpson

[57] ABSTRACT

Gum bases and chewing gum formulations, as well as methods for making same, are provided. The gum base and chewing gums include an edible polyester.

20 Claims, No Drawings

GUM BASE AND CHEWING GUM CONTAINING EDIBLE POLYESTERS AND METHOD FOR MANUFACTURE

RELATED APPLICATIONS

This is a continuation-in-part of PCT patent application PCT/US96/16986, filed on Oct. 22, 1996.

BACKGROUND OF THE INVENTION

The present invention relates generally to chewing gum. More specifically the present invention relates to improved formulations for chewing gum and gum bases.

It is of course known to construct chewing gum from a water insoluble gum base and a water soluble portion along with flavor(s). Gum base is designed to be retained in the mouth throughout the chewing period The water soluble portion and flavors are designed to dissipate during chewing.

Insoluble gum base generally comprises elastomers, resins, fats and oils, softeners, and inorganic fillers. The elastomers can include either synthetic elastomers or natural elastomers. Natural elastomers include natural rubber. Synthetic elastomers include polyisobutylene, isobutylene-isoprene copolymers, styrene-butadiene copolymers, polyvinyl acetate, polyisoprene, polyethylene, vinyl acetate - vinyl laurate copolymers, and combinations thereof.

It is also known to use in gum base elastomer plasticizers. Such elastomer plasticizers can include natural rosin esters as well as other elastomer plasticizers. Additionally, chewing gum base can include filler/texturizers and softener/emulsifiers. Softeners optimize the chewability and mouth feel of the chewing gum. Softener/emulsifiers that are typically used include tallow, hydrogenated tallow, hydrogenated and partially hydrogenated vegetable oils, cocoa butter, glycerol monostearate, glycerol triacetate, lecithin, and combinations thereof.

In addition to a water insoluble gum base portion, a typical chewing gum composition includes a water soluble portion and one or more flavoring agents. The water soluble portion can include bulk sweeteners, high intensity sweeteners, flavoring agents, softeners, emulsifiers, colors, acidulants, fillers, antioxidants, and other components that provide desirable attributes.

SUMMARY OF THE INVENTION

The present invention provides improved chewing gum formulations and bases, as well as methods of producing chewing gum and bases. Pursuant to the present invention chewing gum and gum bases that include edible polyesters are provided. In this regard, traditionally used elastomers and elastomer plasticizers can be replaced with edible polyesters.

To this end the present invention provides, in an embodiment, a gum base including at least one edible polyester that is produced through a reaction of at least one alcohol chosen from the group consisting of glycerol, propylene glycol, and 1,3 butylene diol, and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid and tartaric acid.

In an embodiment, the base is wax-free.

In an embodiment, the base is non-tacky.

In an embodiment, the base is a bubble gum-type base.

In an embodiment, the edible polyester comprises approximately 1% to about 80% by weight of the base.

In another embodiment, the present invention provides a gum base including at least approximately 1% by weight of an edible polyester that is a product of a condensation reaction of at least one alcohol chosen from the group consisting of trihydroxyl alcohol and dihydroxyl alcohol, and at least one acid chosen from the group consisting of dicarboxylic acid and tricarboxylic acid.

In a further embodiment, the present invention provides a chewing gum formulation comprising an insoluble gum base, a water soluble portion, a flavor, and at least 0.1% by weight of an edible polyester. The edible polyester is produced by the reaction of at least one alcohol chosen from the group consisting of glycerol, propylene glycol, and 1,3 butylene diol and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid and tartaric acid.

In an embodiment, the formulation includes a bulk sweetener.

In an embodiment, the formulation includes a high intensity sweetener.

In an embodiment, the formulation includes an elastomer plasticizer.

In an embodiment, the formulation includes an elastomer.

In an embodiment, the chewing gum is sugar free.

In yet a still further embodiment, the present invention a method for manufacturing chewing gum comprising the step of adding to a water soluble portion and a flavor an edible polyester that is produced by the condensation reaction of at least one alcohol chosen from the group consisting of trihydroxyl alcohol and dihydroxyl alcohol and at least one acid chosen from the group consisting of dicarboxylic acid and tricarboxylic acid.

It is an advantage of the present invention to provide an improved gum base.

Still further an advantage of the present invention is to provide an improved chewing gum formulation.

Another advantage of the present invention is to provide an improved method for making chewing gum.

Still further an advantage of the present invention is to provide an improved method for making gum base.

Moreover, an advantage of the present invention is that the gum base is biodegradable.

Furthermore, an advantage of the present invention is to replace traditional elastomers or elastomer plasticizers in chewing gum bases with other polymers.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved chewing gum formulations and gum base formulations. To this end, the present invention allows for the replacement or substitution for traditional elastomers and elastomer plasticizers with other polymers specifically edible polyesters.

Polyesters are polymers obtained by the esterification of dicarboxylic acid and dihydroxyl alcohol. Ester linkages may be formed at each end of each molecule. Thus, it is possible to build up a large molecule containing many ester linkages.

For example, one of the most common polyesters in use is polyethylene terephthalate made from ethylene glycol and terephthalic acid. Polyethylene terephthalate was developed as a fiber called Dacron. This polyester can also be used to make a film having unusual strength. Polyethylene terephthalate is currently used to make PET (polyethylene terephthalate) plastic bottles used for soft drinks.

In making polyesters, if a trihydroxyl alcohol such as glycerol is used, possible crosslinking occurs. The resultant resinous materials, glyptols, from glycerol and phthalic acid, find applications as coatings in the lacquer and paint industry.

It is possible to construct polyesters from edible or food grade materials. To this end, the tri or dihydroxyl alcohols glycerol, propylene glycol, and 1,3-butylene diol can be reacted with tri- or dicarboxylic acids such as citric, fumaric, adipic, malic, succinic, and tartaric acids.

With respect to these alcohols and acids, the reaction of the alcohol and acid form the ester linkages. As the reaction continues extended polyester chains are created by a condensation reaction. An initial study of various polyesters from these materials by the condensation reaction yielded polyesters that had rubbery, plastic or hard, resin-like textures. Because the starting alcohols and acids are food grade materials the resultant product is edible and can be used in food or confectionary products.

By way of example and not limitation, several polyesters were made using the various food acids and glycerol or propylene glycol. Gram quantities were made in a test tube heated in an oil bath at about 180°–250° C. from ½ hr. to 5 hours to obtain polyesters.

The following polyesters were made:

|   |   | Molar Ratios | |
|---|---|---|---|
|   |   | Glycerin | Propylene Glycol |
| A | Adipic Acid | 2\1.28 | — |
| B | Adipic Acid | 3.54\1.66 | — |
| C | Adipic Acid | 1.4\2.03 | — |
| D | Malic Acid | 2.0\1.28 | — |
| E | Malic Acid | — | 2\1 |
| F | Malic Acid | 2\0.5 | — |
| G | Adipic/Malic Acid | 1\1\1.28 | — |
| H | Adipic/Malic Acid | — | 1.5\1.5\1 |
| I | Adipic Acid | — | 2\1 |
| J | Adipic Acid | — | 2\2 |
| K | Tartaric Acid | 2\1 | — |
| L | Fumaric Acid/Citric Acid | — | 1\1\1 |
| M | Fumaric Acid | 2\1 | — |
| N | Fumaric Acid/Citric Acid | 1\1\1 | — |
| O | Adipic Acid | 2\1\1** | — |
| P | Adipic Acid | — | 2\.1*\2 |
| Q | Adipic Acid | — | 2\.25\1 |
| R | Adipic Acid | — | 2\0.4*\2 |

*Low levels of Glycerol added
**Made with Adipic Acid\Glycerin\Propylene Glycol

Products that were formed were viscous liquids to waxy rubbery-like or plastic gels to hard gels. Generally, as the mixtures were heated, moisture was driven off. Over several hours, liquids turned to gels or if removed from heat became solid gels.

The resultant polyesters were soft to hard plastic and soft to hard rubbery characteristics that had resin like texture. These polyesters appear to be very useful in a gum product. The glycerol adipate polyester was insoluble in water, chloroform, methanol, isopropyl alcohol, 0.1N sodium hydroxide, and concentrated HCl. Other polyesters were not tested for solubility but are believed to be less than 1% soluble in water.

The compatibility of polyesters with other gum base ingredients can be improved by increasing the lipophilicity of the polyester. This can be accomplished by increasing the length of the carbon backbone between the two acids of the dicarboxylic acid molecule.

In this regard, adipic acid has a 4 carbon chain between the two carboxylic acid groups. By increasing the carbon chain between the two groups to a 6, 8, or 10 carbon chain, lipophilicity can be increased. The 6 carbon chain diacid is suberic acid, and 8 carbon chain diacid is sebacic acid, and the I0 carbon chain diacid is dodecanedioic acid.

Other types of naturally occurring diacids may also be used to provide a more lipophilic polyester. Some such diacids include glucaric acid, glutamic acid, glutaric acid, and azelaic acid. Other materials that have at least two carboxylic acids or alcohol groups can also be used as reactants. Such materials with alcohol or hydroxyl groups are sorbitol, mannitol, glycerol monofatty acids and hydrocolloids.

In addition, low levels of mono carboxylic acids and/or monohydroxyl alcohols may be added to the reaction mixture/polyester of dihydroxyl or tricarboxylic alcohol and dicarboxylic or tricarboxylic acids to react with any free alcohol or acid groups, respectively. Monohydroxyl alcohols such as ethanol, butanol or octanol, or acids such as acetic acid, stearic acid, palmitic acid or other fatty acids may be used. These materials will endcap the polyester to keep it from reacting with other materials, and can also modify the physical properties of the polyester.

Polyesters can be made by a variety of processes. Besides conventional methods of production, polyesters can be made by a condensation reaction in an extruder, by a condensation reaction in a batch process, or may be made by an enzymatic processes. The process of making the polyester is not limiting.

The polyesters that can be used pursuant to the present invention are not limited to linear polyesters, but can also include polyesters that may be branched or crosslinked. These may be made with tricarboxylic acids or trihyrdoxyl alcohols. The desired polyester may have a broad range of physical properties from thick and syrupy to hard and rubbery with thermoplastic properties.

The examples of polyesters set forth below were prepared from adipic acid and glycerin or propylene glycol. Both glycerin and propylene glycol were predried by heating in a round bottom flask at 50–60° C. under vacuum overnight and stored over a dry helium atmosphere. By way of example, and not limitation, the following examples were made:

EXAMPLE A

In a 2L cylindrical glass reactor equipped with a mechanical stirrer and heating jacket, 800 g of dried glycerol was charged. A stream of dry helium was circulated in the reactor and the outlet was connected to a trap maintained in ice-water.

The solution was heated to 100° C. for 90 min. Then 1900g of adipic was charged into the reactor and the temperature was raised to 150° C. Water droplets started condensing. The amount of water condensed is tabulated below as a function of reaction time.

| Time of Reaction | Amount of water condensed | Extent of reaction completed |
| --- | --- | --- |
| 90 min | 100 g | 21% |
| 150 min | 200 g | 42% |
| 180 min | 250 g | 53% |
| 220 min | 310 g | 66% |
| 240 min | 340 g | 72.6%\ |

After 4 hrs the gel point was reached. Two samples were picked out from the reactor at 180 min (Sample #A) and 220 min of reaction (Sample #AA) for analysis. The final product (Sample AAA) was recovered from the reactor. It was observed that the product near the walls was more sticky than the product inside the reactor and was kept in a separate jar. The product inside the reactor was foamy.

FTIR spectroscopy analysis of polymer films of samples A and AA cast on KBr windows from chloroform solutions confirmed the polycondensation products. Also the amount of water condensed from the reaction indicated polyester formation.

EXAMPLE B

In a 3L cylindrical glass reactor equipped with a mechanical stirrer and heating jacket, 700 g (9.19 mole) of dried propylene glycol was charged. A stream of dry helium was circulated in the reactor and the outlet was connected to a trap maintained in ice cold water.

The solution was heated to 100° C. for 90 min. Then 1344.5 g (9.19 mole) of adipic acid was charged into the reactor and the temperature was raised to 150° C. Water droplets started condensing. After two hours the reaction temperature was raised to 180° C. In about 3 hrs. 210 ml of water was collected in the trap. The temperature of the reactor was maintained at 1 80° C. and vacuum was applied for about 2 hrs. An additional 120 ml of water was collected in the trap.

An SEC (Size Exclusion Chromatography) analysis (Sample B) of the product indicates the presence of dimers and trimers. The total Mw (Weight Average Molecular Weight) of the product was found to be 2800 and (Weight Average Molecular Weight/Number Average Molecular Weight=Polydispersity) Mw/Mn=1.75.

The mechanical stirrer was removed from the reactor and the solution was heated further under vacuum ($10^{-3}$ mm Hg) at 150° C. for 2 hrs; at 180° C. for 2 hrs; and at 200° C. for another 5 hrs. A 15 ml quantity of condensate was collected during this period of heating under a vacuum. An SEC analysis of this product (Sample #BB) shows a Mw of 5500 with Mw/Mn=1.90.

EXAMPLE C

In a 3L cylindrical glass reactor equipped with a mechanical stirrer and heating jacket, 700 g (9.19 mole) of dried propylene glycol was charged. A stream of dry helium was circulated in the reactor and the outlet was connected to a trap maintained in ice cold waters.

The solution was heated to 70° C. for 30 min. Then 1344.5 g (9.19 mole) of adipic acid was charged into the reactor and the temperature was raised to 100° C. 15 Water droplets started condensing. After one hour 5 ml of HCl (0.5 mole %) was added as a catalyst and the reaction temperature was raised to 150° C. In about 1 hr. 100 ml of water was collected in the trap. The pH of the collected water was around 4. The temperature of the reactor was raised to 180° C. and around 145 ml of water was collected in the trap.

An SEC analysis (Sample C) indicates the presence of dimers and trimers. The total Mw of the product was 1700 and Mw/Mn=2.43.

The mechanical stirrer was removed from the reactor. 2.5 ml (0.25 mole %) of HCl was added and the solution was heated further under vacuum ($10^{-3}$ mm Hg) at 220° C. for 4 hrs. A 25 ml quantity of condensate was collected during this period of heating under vacuum. An SEC analysis of this product (Sample #CC) shows the Mw to be 3700 with Mw/Mn=2.47.

As in Example B, size exclusion chromatography (SEC) was carried out on a Varian liquid chromatograph equipped with a refractive detector. Three GPC columns from Supelco were used with THF as the eluent. The columns were calibrated with monodisperse polystyrene standards. The molecular weights and the polydispersity indice were calculated.

EXAMPLE D

In a 3L cylindrical glass reactor equipped with a mechanical stirrer and heating jacket, 313 g (4.11 mole) of dried propylene glycol and 252 g (2.74 mole) of glycerol were charged. A stream of dry helium was circulated in the reactor and the outlet was connected to a trap maintained in ice cold water.

The solution was heated to 75° C. for an hour. Then 1200 g (8.22 mole) of adipic acid was charged into the reactor and the temperature of the reactor was kept at 75° C. for 2 hours. The temperature was raised to 180° C. and water droplets started condensing. After 2 hours, 140 ml of water was collected in the trap. The temperature of the reactor was increased to 220° C. and around 90 ml of water was collected in another 2 hrs. Vacuum was applied for about 1 hr at 220° C.

The solution became viscous and turned into a gel in about 1 hr. An additional 30 ml of water was collected in the trap. The final product (Sample D) was soft, sticky and difficult to remove from the reactor.

EXAMPLE E

In a 3L cylindrical glass reactor equipped with a mechanical stirrer and heating jacket, 468 g (6.15 mole) of dried propylene glycol and 252 g (2.74 mole) of glycerol were charged. A stream of dry helium was circulated in the reactor and the outlet was connected to a trap maintained in ice cold water.

The solution was heated to 75° C. for an hour. Then 1500 g (10.26 mole) of adipic acid was charged into the reactor and the temperature was kept at 75° C. for 2 hrs. The temperature was raised to 180° C. and water droplets started condensing. After 2 hrs. 140 ml of water was collected in the trap. The temperature of the reactor was increased to 220° C. and around 100 ml of water was collected in another 2 hrs. Vacuum was applied for about 1 hr at 220° C.

The solution became viscous and a sample was collected after 30 min. (Sample EE). It was fluid-like. The vacuum was applied for another 30 min. upon which the solution turned into a gel. An additional 70 ml of water was collected in the trap. The reactor was allowed to cool and final product was recovered. The product (Sample E) was soft and sticky.

Samples D, E, EE were cross linked and would not dissolve in THF and therefore were not analyzed by SEC.

In order to determine the amount of initial material remaining a water washing of Example E was done. Using a Brabender Plasticorder with a 120 ml Sigma mixer bowl and blade, 75.8 g of Example E was mixed with 20 ml of deionized water for 16 minutes. After some swelling another 20 ml of water was added and mixed 16 minutes. Then the water extract was removed and more water added. This was repeated 5 more times and the extracts analyzed for solids content. A total of 1.7% of Example E was extracted indicating very little material remained in the polyester. Polyester examples D & E were soaked in deionized water at room temperature for about I week. The polyesters were removed from the water and dried in a vacuum oven overnight at 45 to 50° C.

The following gum bases were made from the 2 washed polyesters using a Haake Rheocord Rheometer and Sigma mixer.

Base Example 1

A 50.0 gram quantity of polyester of Example D was placed in a Haake Rheocord with a Sigma blade mixer. Added to this was 20.0 grams of calcium carbonate and blended for 15 minutes at 115° C.

Base Example 2

A 45.0 gram quantity of base of Example 1 above was added to the Haake Rheocord and blended at 115° C. with 20.0 grams of medium molecular weight PV Ac for 15 min.

Base Example 3

A 50.2 gram quantity of polyester of Example E was placed in the Haake Rheocord with the sigma mixer blade. Added to this was 30.0 grams of calcium carbonate and blended at 115° C. for 20 minutes.

Base Example 4

A 40.8 gram quantity of base of Example 3 was placed in the Haake Rheocord and blended at 115° C. with 10.0 grams of low molecular weight PV Ac for 10 minutes.

Gum Examples 5, 6, and 7

The following gums were made from bases made above in a Brabender Plasticorder at 37° C.

| Base Examples | Ex 5<br>Ex 1 | Ex 6<br>Ex 2 | Ex 7<br>Ex 4 |
| --- | --- | --- | --- |
| Base, grams | 18 | 18 | 18 |
| Sugar, grams | 41 | 41 | 41 |
| 45Be Corn Syrup, grams | 11 | 11 | 11 |
| Peppt. Flavor, grams | 0.7 | 0.7 | 0.7 |
| Total | 70.7 | 70.7 | 70.7 |

Gum evaluation showed Example 5 with polyester and calcium carbonate had a good initial texture but became very soft and tacky in the late chew texture. Example 6 had a good initial texture as well as a good texture character throughout and was slightly tacky. Example 7 had a good initial texture, but became slightly soft and slightly tacky late.

The polyesters made here were not readily compatible with other base ingredients such as elastomers, elastomer plasticizers, waxes, and fats. By using a 2-monoglyceride as the starting diol instead of glycerin or propylene glycol, it is believed that more compatible polyesters can be developed and used with other gum base ingredients.

It was concluded that a quality chewing gum base and gum product can be made from polyesters from adipic acid and glycerol and/or propylene glycol.

By way of further example, a series of samples of polyesters were made using the following procedure:

Procedure

The reactants were added to a 2-liter reaction flask having a heating jacket and equipped with a stirrer, a nitrogen inlet, a nitrogen/vacuum outlet with a trap, and a thermocouple. The reactants were added to the reaction vessel in the desired molor ratios of alcohol and acid groups (usually stochoimetrically equivalent).

The reaction vessel was purged with nitrogen and heated to 130° C. (sometimes as high as 150° C. to ensure melting of both reactants). After the reactants were melted, the mixture was stirred with a mechanical stirrer. The mixture was allowed to react for 2–3 hours.

Water was then collected in the condenser and measured to determine the extent of the reaction. Next, the temperature was raised to 150° C. (if it was not there already). When water elution slows (usually about an hour), the nitrogen purge was discontinued and the system was run under vacuum. When water elution slowed again (about 1 hour), the temperature was raised to 180° C. After the polyester forms a viscous gel (about 70% reaction completion) that stops the mixer (usually about 0.5 to 1 hour), the heat was removed. The polyester was then removed and allowed to cool.

The polyester was then cut into small chunks and placed into a soxhlet tube. The polyester was washed with boiling anhydrous ethanol in a soxhlet for about 5 hours to remove low molecular weight polyester (about 10–30% of the original polyester). The "clean" polyester was then dried overnight in a vacuum oven at 40–50° C.

EXAMPLES MADE USING THIS PROCEDURE

Example F

A glycerol/adipic acid polyester was made by the above procedure using 1408.35 grams of adipic acid and 591.65 grams of glycerol. This polyester had good rubbery properties.

Example G

A glycerol/suberic acid polyester was made by the above procedure using 1478.82 grams of sebacic acid and 521.18 grams of glycerol. This polyester had good rubbery properties.

Example H

A glycerol/sebacic acid polyester was made by the above procedure using 1534.27 grams of sebacic acid and 465.73 grams of glycerol. This polyester also had good rubbery properties.

Example J

A glycerol/dodecanedioic acid polyester was made by the above procedure using 1263.24 grams of dodecanedioic acid and 336.76 grams of glycerol. This polyester also had good rubbery properties.

Example K

A 1,3-butanediol/adipic acid polyester was made by the above procedure using 1280.14 grams of adipic acid and 789.59 grams of 1,3-butanediol. This was a linear polyester that was thick and syrupy, but not as rubbery as the other examples.

During the clean-up extraction process for the above examples, the longer chain aliphatic diacid polyesters yielded about 10% extractables, whereas the adipic acid/glycerin polyester yielded about 20–30% extractables. This suggests that the longer chain backbone of sebacic acid, suberic acid, or dodecanedioic acid provides polyesters that are more lipophilic.

Base Example 8

A 28 gram quantity of polyester of Example F, a 28 gram quantity of polyester of Example J, and a 14 gram quantity of starch were blended in a Haake Rheocord with a Sigma blade mixer for 10 minutes at 115° C. to make a chewing gum 10 base.

Base Example 9

A 35 gram quantity of polyester of Example J, 21 gram quantity of starch, and a 14 gram quantity of low molecular weight PVAc blended in a Haake Rheocord with a Sigma blade mixer for 10 minutes at 115° C. to make a chewing gum base.

Base Example 10

A 35 gram quantity of polyester of Example F, 21 gram quantity of starch, and a 14 gram quantity of low molecular weight PVAc were blended in a Haake Rheocord with a Sigma blade mixer for 10 minutes at 115° C. to make a chewing gum base.

Base Example 11

A 35 gram quantity of polyester of Example F, 28 gram quantity of starch, and a 7 gram quantity of low molecular weight PVAc were blended in a Haake Rheocord with a Sigma blade mixer for 10 minutes at 115° C. to make a chewing gum base.

Base Example 12

A 35 gram quantity of polyester of Example J, 21 gram quantity of starch, a 7 gram quantity of low molecular weight PVAc, a 3.5 gram quantity hydrogenated cottonseed oil, a 2.1 gram quantity of hydrogenated soybean oil, and a 1.4 gram quantity of glycerol monstearate were blended in a Haake Rheocord with a Sigma blade mixer for 10 minutes at 115° C. to make a chewing gum base.

Base Example 13

When the adipic acid/glycerol polyester of Example F was substituted for Example J in the base formula of Example 12, the composition did not yield a homogeneous mix together. Thus, the longer backbone carbon chain did improve the lipophilic properties of the polyester.

Gum Examples 14, 15, 16, 17, and 18

Five examples of chewing gum were made with Base Examples 8, 9, 10, 11 and 12, respectively, in a Brabender Plasticorder at 37° C. using the following gum formula:

|  | % |
| --- | --- |
| Base | 19.3 |
| Sugar | 57.4 |
| Corn Syrup | 13.9 |

-continued

|  | % |
| --- | --- |
| Dextrose Monohydrate | 7.3 |
| Glycerin | 1.2 |
| Fruit Flavor | 0.8 |
| Lecithin | 0.1 |

Samples of these chewing gums made from these formulas gave good flavor release and texture. It was concluded that a quality chewing gum base and gum product can be made from the polyesters obtained from longer chain hydrocarbon dicarboxylic acids and glycerol.

Chewing gum Examples 16 and 17 were washed with warm tap water to remove solubles and the resulting gum bolus made with Base Examples 10 and 11 (glycerol/adipic acid polyester, starch, and low molecular weight PVAc) were tested for biodegradability using an ASTM test method (ASTM D5209). The bolus of Example 10 with 20% PVAc was about equal in biodegradability to Kraft paper, an accepted standard for comparison. The bolus of Example 11 with 10% PVAc was more biodegradable than Kraft paper.

Pursuant to the present invention, the polyesters can be used in base formulations and/or chewing gum formulations. In this regard, the polyesters can be used as elastomers and/or elastomer plasticizers. As part of a gum base, the edible polyesters can comprise approximately 1 to about 80% by weight of the gum base. As part of the chewing gum, the edible polyesters can comprise approximately 0.1 to about 70% by weight of the chewing gum.

The polyesters can be used in a variety of different chewing gum and base formulations.

As previously noted, chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 1% to about 80% weight percent food grade polyester, about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

If used, natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

If used, elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing, the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, tale, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, galactose, corn syrup solids, and the like, alone or in combination.

Sorbitol can be used as a sugarless sweetener. Additionally, sugarless sweeteners can include, but are not limited to, other sugar alcohols such as mannitol, hydrogenated isomoltulose (palatinit), xylitol, hydrogenated starch hydrolysates, maltitol, lactitol and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from five to fifteen minutes, although longer mixing times are sometimes required.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A gum base including at least one polyester that is produced through a reaction of glycerol and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid, and tartaric acid.

2. The gum base of claim 1 wherein the base is wax-free.

3. The gum base of claim 1 wherein the base is non-tacky.

4. The gum base of claim 1 wherein the base is a bubble gum-type base.

5. The gum base of claim 1 wherein the polyester comprises approximately 1% to about 80% by weight of the base.

6. The gum base of claim 1 including at least one elastomer.

7. A gum base including at least approximately 1% by weight of a polyester that is a product of a reaction of trihydroxyl alcohol and one acid chosen from the group consisting of dicarboxylic acid and tricarboxylic acid.

8. The gum base of claim 7 wherein the base is wax-free.

9. The gum base of claim 7 wherein the base is non-tacky.

10. The gum base of claim 7 wherein the base is a bubble gum-type base.

11. The gum base of claim 7 wherein the polyester is produced by the reaction of glycerol and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid, and tartaric acid.

12. The gum base of claim 7 including at least one elastomer.

13. A chewing gum formulation comprising:

an insoluble gum base;

a water soluble portion;

a flavor; and at least 0.1% by weight of a polyester produced by the reaction of glycerol and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid, and tartaric acid.

14. The chewing gum formulation of claim 13 wherein the formulation includes a bulk sweetener.

15. The chewing gum formulation of claim 13 wherein the formulation includes a high intensity sweetener.

16. The chewing gum formulation of claim 13 wherein the formulation includes an elastomer plasticizer.

17. The chewing gum formulation of claim 13 wherein the formulation includes an elastomer.

18. The chewing gum of claim 13 wherein the chewing gum is sugar free.

19. A method for manufacturing chewing gum comprising the step of adding to a water soluble portion and a flavor an edible polyester produced by the reaction of trihydroxyl alcohol and at least one acid chosen from the group consisting of dicarboxylic acid and tricarboxylic acid.

20. The method of claim 19 including the step of adding at least one elastomer to the water soluble portion, flavor, and edible polyester.

* * * * *